United States Patent [19]

Loskorn

[11] 4,453,228

[45] Jun. 5, 1984

[54] COMPONENT SELECTION SYSTEM FOR A MULTIPLE LINE ADAPTER ORGANIZATION

[75] Inventor: Richard A. Loskorn, Dana Point, Calif.

[73] Assignee: Burroughs Corporation, Detroit, Mich.

[21] Appl. No.: 363,592

[22] Filed: Mar. 30, 1982

[51] Int. Cl.³ .............................................. G06F 3/00
[52] U.S. Cl. ............................................... 364/900
[58] Field of Search ...................................... 364/900

[56] References Cited

U.S. PATENT DOCUMENTS 4,393,461  7/1983  Holtey et al. ...................... 364/900

Primary Examiner—Raulfe B. Zache
Attorney, Agent, or Firm—Alfred W. Kozak; Nathan Cass; Kevin R. Peterson

[57] ABSTRACT

A multiple group of line adapters in a data-comm I/O subsystem is controlled by a microprocessor which provides for selection and control of components associated with each line adapter in the organization.

13 Claims, 6 Drawing Figures

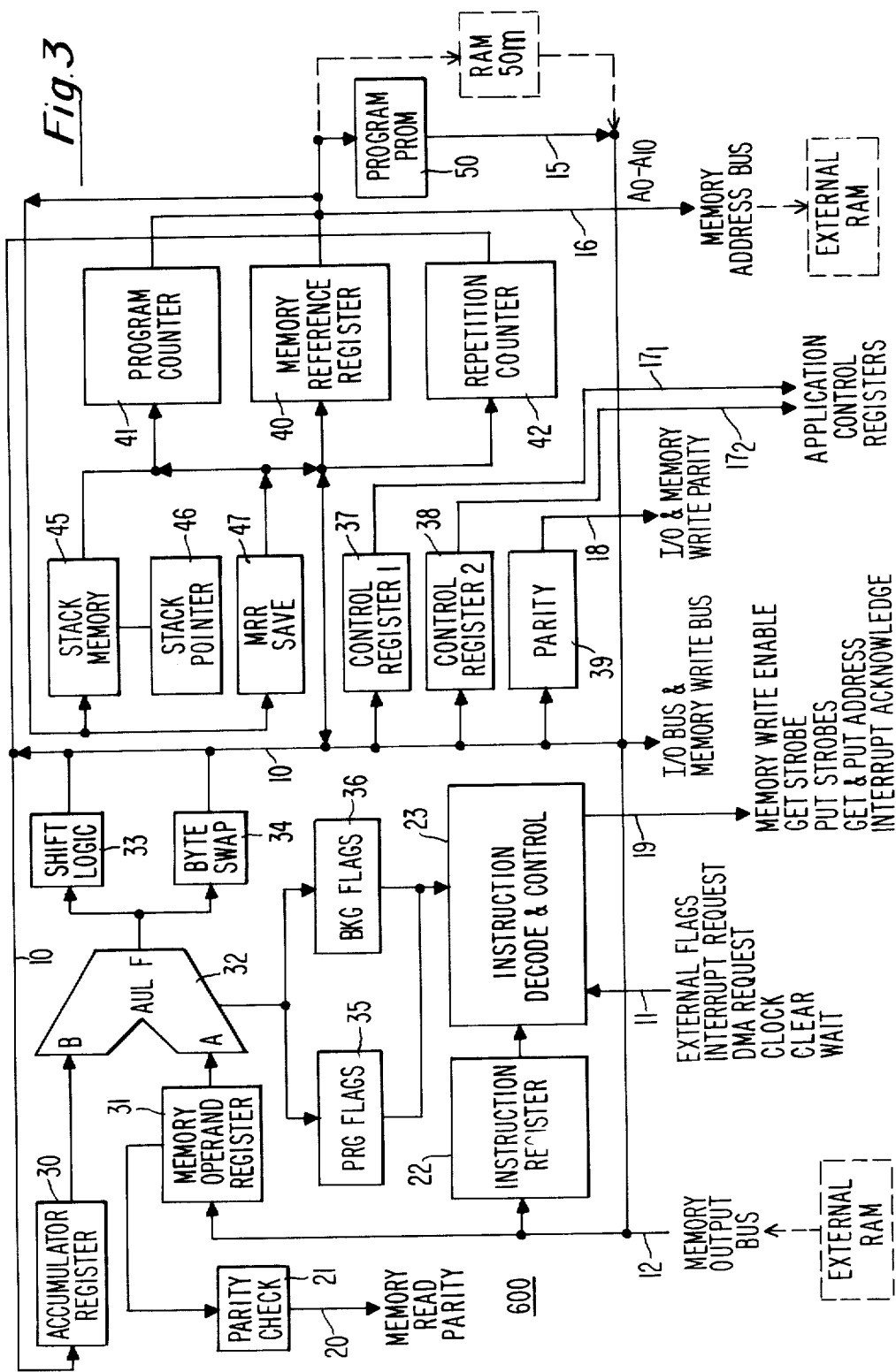

COMPONENT SELECTION SYSTEM FOR A MULTIPLE LINE ADAPTER ORGANIZATION

FIELD OF THE INVENTION

This disclosure relates to data-comm systems using multiple line adapters, each of which handles a separate communication line to a data terminal.

CROSS REFERENCES TO RELATED APPLICATIONS

This disclosure is also related to two applications entitled "Byte Oriented Line Adapter System" and "Bit Oriented Line Adapter System", inventors Richard A. Loskorn, Philip D. Biehl and Robert D. Catiller, and filed 3/5/82.

Incorporated by reference are several patents which form a background and explanation for microprocessors used with the line adapters of this disclosure. These patents, which are included by reference, are:

U.S. Pat. No. 4,293,909 entitled "Digital System For Data Transfer Using Universal Input-Output Microprocessor", U.S. Pat. No. 4,291,372 entitled "Microprocessor System with Specialized Instruction Format".

U.S. Pat. No. 4,292,667 entitled "Microprocessor System Facilitating Repetition of Instructions".

U.S. Pat. No. 4,189,769 entitled "Input-Output Subsystem for Digital Data Processing System".

SUMMARY OF THE INVENTION

A multiple number of line adapters are organized to cooperate with a microprocessor wherein logic means work in conjunction with control signals from said microprocessor to permit selection and control of components associated with each line adapter. These components in each line adapter include: RAM storage means, timers and timing means and protocol oriented receiver-transmitter means such as a USART or a synchronous controller.

BRIEF DESCRIPTION OF THE DRAWINGS

FIG. 1 is a schematic drawing of a data-comm I/O subsystem with slide-in cards fitting into a base module backplane and having frontplane connections there between.

FIG. 3 is a block diagram of the state machine processor which controls operations of the line adapter.

DESCRIPTION OF PREFERRED EMBODIMENT

The line adapter selection means of the present disclosure is designed to be used as part of a line support processor (also often called a frame recognition-data link processor) as part of a data comm I/O subsystem.

Figure 1:
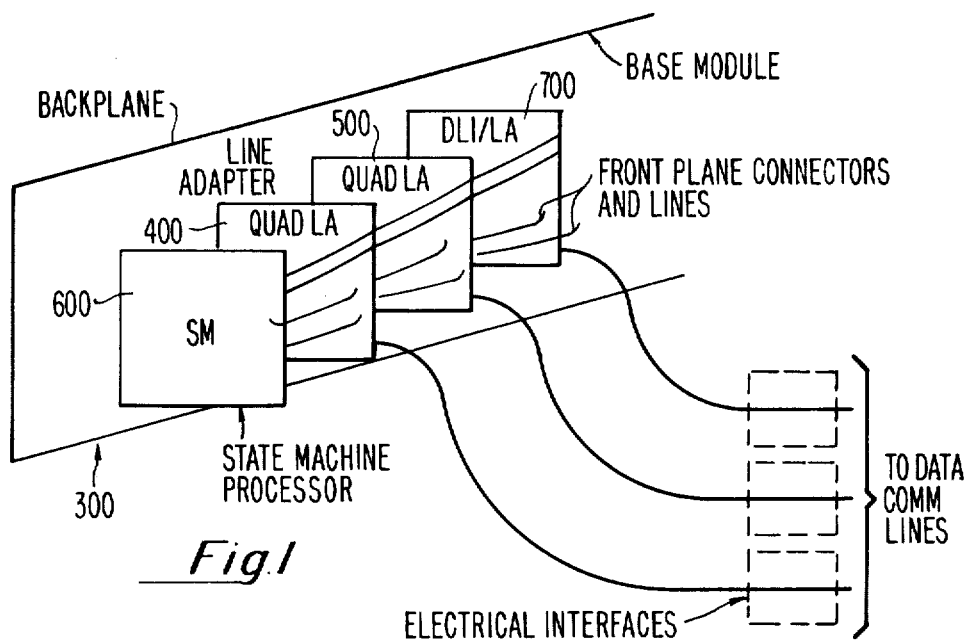

FIG. 1 shows such a data comm I/O subsystem wherein a state machine processor card 600 works in coordination with various types of line adapters. A single line adapter card 700 may be used as well as Quad line adapters such as that shown in cards 400 and 500. These Quad line adapters constitute units of four addressable line adapters, and each line adapter can handle a single data communications line terminal through an electrical interface.

Figure 4:
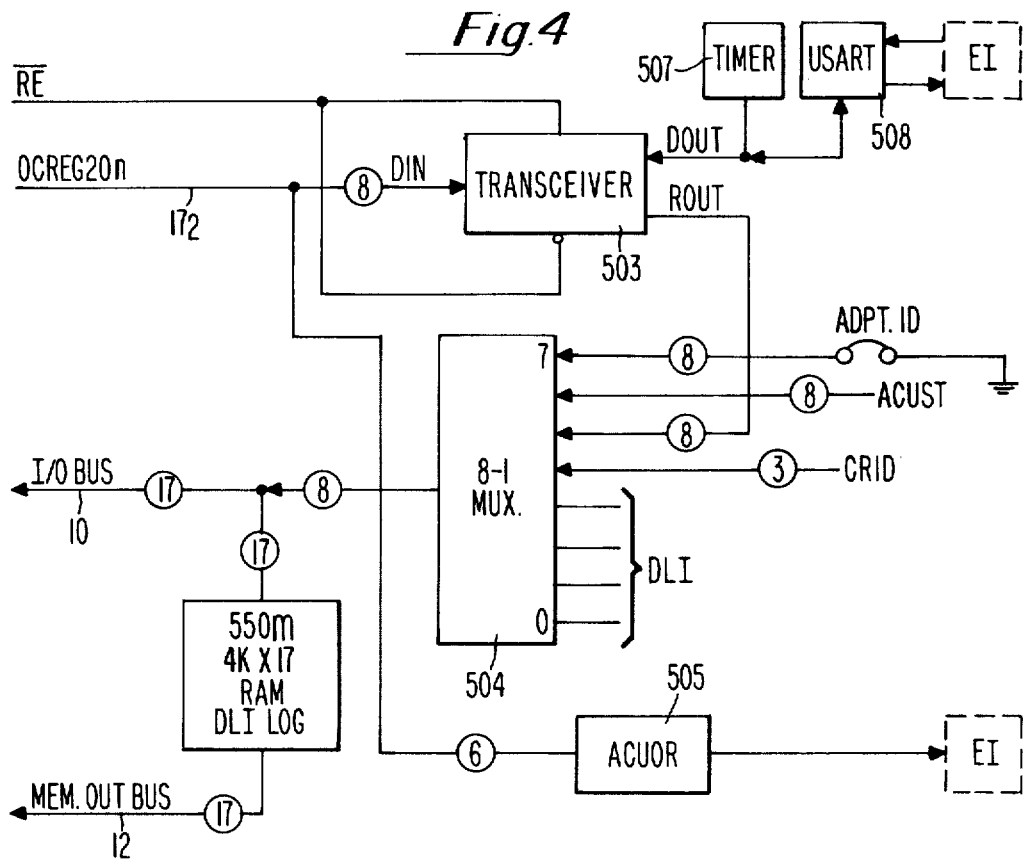
FIG. 4 is a block diagram of a single byte-oriented line adapter.

FIG. 4 shows a block diagram of a "Single" byte oriented line adapter system. A remote data set or data terminal may be connected to input/output circuit means which includes timer 507 and USART 508. This input output circuit connects to a transceiver bus-controller 503 which can route the data to a multiplexor 504 for conveyance along I/O bus 10 to the state machine processor 600 or into a RAM buffer $550_m$. Data in the state machine processor can be routed from the state machine's output control register (38, FIG. 3) along bus 172 into the transceiver bus controller 503 for transmission to the input-output circuit means. The multiplexor 504 receives control signals from the data link interface unit 700 of FIG. 1 in addition to other control signals which identify units within the line adapter system. Also provided is an automatic calling unit output register 505 which can receive signals useful for dialing remote terminals on telephone lines.

Figure 2:
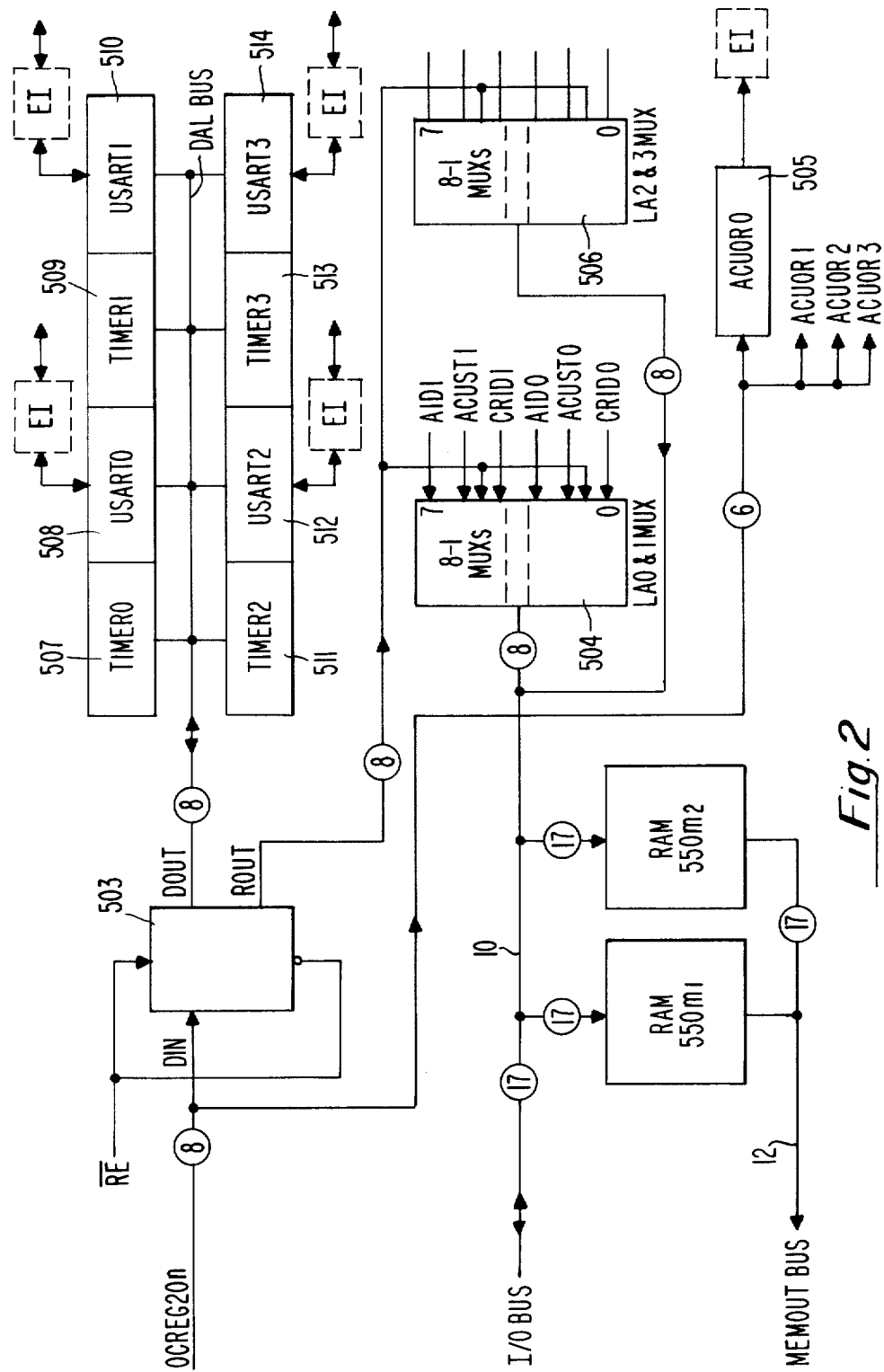
FIG. 2 is a block diagram of a multiple line adapter card.

FIG. 2 is a block diagram of a "Quad" Line Adapter used for byte oriented protocol operations. The input output circuit means which connect to remote terminals is composed of four basic units such as 507, 508 (timer 0 and USART 0). Likewise, input-output service to a remote terminal is provided by timer 509 and USART 1 designated 510. Likewise, units 511, 512 constitute an operating unit for another remote terminal as do units 513 and 514 for yet another remote terminal.

As discussed under FIG. 4, the Line Adapter uses a transceiver bus controller 503 and a set (FIG. 2) of multiplexors 504 and 506. It should be noted that the multiplexors such as 504 and 506 are in essence dual operating multiplexor sets in that they receive control signals from two different input-output units.

Corresponding to the Automatic Calling Unit Output Register of FIG. 4, the Quad Line Adapter of FIG. 2 uses 4 such ACU output registers. Also in the Quad Line Adapter (FIG. 2) there is provided an extra set of RAM buffer memories designated $550_{m1}$ and $550_{m2}$.

FIG. 3 is a block diagram of the State Machine Microprocessor which is used to control the single line adapter or multiple configurations of line adapters. The State Machine Processor (sometimes designated as UIO State Machine) resides on a circuit board of chips which can be inserted as a slide-in card into the base module (FIG. 1) where it connects to the backplane. The State Machine connects to the application dependent logic through the frontplane connectors as seen in FIG. 1.

A detailed description of the elements and use of the UIO State Machine has been the subject of several prior patents which are included herein by reference. These patents are:

U.S. Pat. No. 4,293,909 entitled "Digital System For Data Transfer Using Universal Input-Output Microprocessor", inventors Robert D. Catiller and Brian K. Forbes.

U.S. Pat. No. 4,291,372 entitled "Microprocessor System with Specialized Instruction Format", inventors Brian K. Forbes and Robert D. Catiller.

U.S. Pat. No. 4,292,667 entitled "Microprocessor System Facilitating Repetition of Instructions", inventors Robert D. Catiller and Brian K. Forbes.

The use of a host computer working in conjunction with an I/O subsystem which uses peculiar commands called I/O descriptors, data link descriptors, and result descriptors is shown in U.S. Pat. No. 4,189,769, Feb. 19, 1980, to Darwen J. Cook and Donald A. Millers, II, and entitled "Input-Output Subsystem for Digital Data Processing System" and this patent is also included herein by reference.

Figure 5:
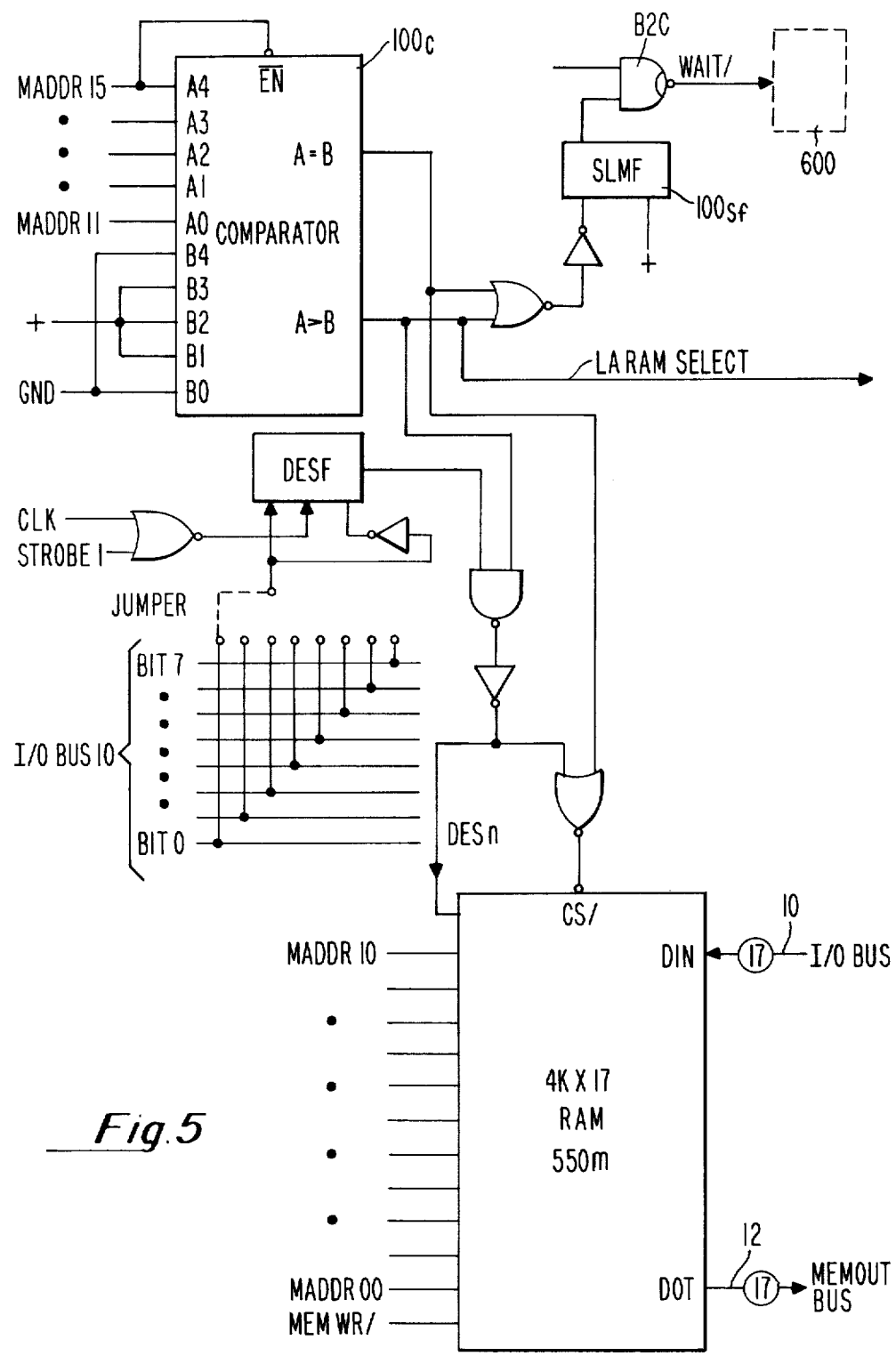
FIG. 5 is a drawing of logic circuitry used to do a component select for line adapter memory or interface memory.

FIG. 5 is a diagram of certain logic on the DLI/LA card 700 which is used to select or "Designate" the RAM buffer memory of the single Line Adapter card or a selected memory of a specific one of the four line adapter memories on the Quad line adapter card. Shown as RAM storage means $550_m$ in FIG. 5 is the particular memory used for the single Line Adapter. However, in the "multiple" Line Adapter situation, each Line Adapter has a similar selection system for selecting the particular memory associated with that Line Adapter.

In FIG. 5, address lines from the State Machine Processor (MADDRnn) connect to a comparator $100_c$ and also to the RAM buffer $550_m$. A chip select signal CS/ is activated to the buffer memory $550_m$ by means of logic signals from the comparator $100_c$ and the Designate Flip-Flop (DESF). A unique jumper bit provides input to the Designate Flip-Flop from the I/O bus 10 in order to particularly identify any given selected buffer memory in the system. The particular bit line of the I/O bus 10, which is to be chosen, is set by the State Machine Microprocessor 600 of FIG. 3.

"BYTE ORIENTED" LINE ADAPTER

A functional section of the Line Support Processor (also called the Frame Recognition-Data Link Processor and/or Line Support Processor-DLP) is the Line Adapter called the "Byte Oriented Line Adapter". This is sometimes also called a "Character Oriented" Line Adapter.

The data comm Line Adapter is basically a device which interfaces on one end to a data communication line "electrical interface", and on the other end interfaces to a processor which has been designated as the UIO State Machine 600 (UIOSM). The primary function of the Line Adapter is to serialize "bit" information to/from "byte" information, to provide timing, to generate service requests, to supply a RAM memory, to provide automatic calling interfacing and to provide connection to level changers which will match the data communication lines. The Byte-Oriented Line Adapter is also built in two basic configurations designated as (i) Quad Line Adapter and (ii) the Single Line Adapter. The Single Line Adapter is part of the Line Support Processor and the Single Line Adapter shares the same board with the Data Link Interface (DLI) circuitry. The Line Adapter is required regardless of the quantity of lines controlled by the Line Support Processor. The Quad Line Adapter contains essentially four (4) Line Adapters on one board. These boards are typical 10 inch by 13 inch boards which plug into the backplane of the Base Connection Module, FIG. 1. Also a smaller version of the Line Adapter may be configured as a "Dual" Line Adapter which consists of two Line Adapters on one board rather than four Line Adapters.

As seen in FIG. 1 each of the Line Adapter cards 400,500 connect both to the State Machine Processor 600 and to the DLI/LA 700 (Data Link Interface-Single Line Adapter).

As seen in FIGS. 2 and 4, connection to the data communications line is through an electrical interface (EI) which connects to the Line Adapter. There are various types of electrical interface boards which exist and which may be mounted in different combinations on the Quad Line Adapters. Thus, depending on the electrical characteristics of the data comm line, the only change required is that of the electrical interface, while the Line Adapter remains as is.

From one to eight Line Adapters may variously be addressed by the State Machine Processor 600; thus, each Line Adapter is jumpered uniquely in order to identify its address. The Line Adapter must be "designated" for the State Machine Processor to communicate with it. Several addressable components are contained on a Line Adapter which the State Machine Processor may communicate with, in the form of Write/Read data or "Status" or "Control" signals.

The addressable components of the Byte Oriented Line Adapter are:
(i) USART (508, 510, 512, 514, FIG. 2)
(ii) Timer (507, 509, 511, 513, FIG. 2)
(iii) Auto Call Output Registers
(iv) Auto Call Status for each ACU
(v) Component Requestors (units in USART and/or Timers)
(vi) Memory (RAM)

The USART (Universal Synchronous/Asynchronous Receiver/Transmitter) accepts data "bytes" from the State Machine Processor 600 and converts them into serial "bits" for transmission; it also receives serial bit data and converts this to parallel data bytes. The USART device is initialized by "writing" into its two internal control registers which specify the manner in which it operates.

A typical USART preferred for this purpose is manufactured by Western Digital Corporation, 3128 Redhill Ave., Newport Beach, Calif. 92663, and is designated as UC1671 and described in a Technical Manual dated August 1978 as UC1671 Asynchronous/Synchronous Receiver/Transmitter.

Various bits of the internal control registers of this USART unit specify such things as: synchronous/asynchronous mode; bits per character; parity; transparent mode; Echo mode. The Timer used on the Byte Oriented Line Adapter serves two basic functions: (i) as program timers and (ii) as baud rate generators for asynchronous operation. Three independent internal timers are contained in each chip, two of which are used by the software for timing purposes relative to the line operations for "transmit" and for "receive" operation. The third timer is used to generate a square wave clock which is used by the USART for asynchronous operation. Each timer is initialized independently, which indicates the "mode" in which it is to operate. The two program timers are capable of activating a Flag signal to the State Machine Processor 600 when a pre-determined timing value has been reached.

The Auto Call Output Register (ACUOR 505) is a register which is loaded by the State Machine Processor with "dial digit" and control information. The output of this register drives level-changer chips which convert the logic signals to EIA RS-232 voltages. These signals drive an automatic calling unit (ACU) such as a Bell 801, which provides dial-out capabilities.

Auto Call Status (ACUST 0, 1, 2, 3 of FIG. 2) is a means of providing the condition or state of input lines from the automatic calling unit (ACU) to the State Machine Processor 600. Lines from the ACU are received by level-changer chips which convert the EIA voltages to TTL logic levels. These logic levels may be read by the State Machine Processor to determine the present status.

The Component Requestors from a Line Adapter are as follows: (i) USART; (ii) Program Timer 1; (iii) Program Timer 2.

These three components are capable of generating "service requests" independently of each other at unique times relative to its initialization. The "service requests" activate a flag signal to the State Machine Processor which indicates that Line Adapters require servicing. After the State Machine determines which Line Adapters are requesting service, it must then determine which "component" on a particular Line Adapter is requesting service.

Memory on the Line Adapter consists of 2,048×17-bit words of RAM for each line. Therefore, each Quad Line Adapter card actually contains 8,192×17-bit words of RAM. The Single Line Adapter card (FIG. 4) contains 4,096 words of RAM $550_m$, one half for the data comm line and the remainder for DLI 700, FIG. 1. RAM is used by the software for transmit/receive message buffering, for tables and for statements associated with the line operation.

BYTE ORIENTED LINE ADAPTER—OPERATION

Designate: When the State Machine Processor 600 executes code relative to an addressable component on a Line Adapte (LA), the LA must be "designated". Each Line Adapter contains a Flip-Flop, whose input is jumpered to a specific bit of the I/O bus FIG. 5. In order to "designate" a Line Adapter, the State Machine Processor must execute a PUT OP with Strobe No. 1 and the corresponding bit of the I/O bus must be equal to 1. Executing the same OP with the I/O bus bit equal to 0 will reset the Designate Flip-Flop shown typically as "DESF" on FIG. 5.

Flag Operation: The various components of a Line Adapter are capable of producing "service requests". These "service requests" are basically ORed together in order to drive a common FLAG line for all Line Adapters. A signal line, FLAG 2/, when being low active, notifies the State Machine Processor that some Line Adapters are requesting service. The State Machine Processor can determine which Line Adapters are requesting service by executing a GET OP with the variant field V-FLD (4:5) equal to 00001. The Line Adapter does not need to be "designated" for execution of this OP.

"Register address" (REGADRn) signals in the Line Adapters are the five V-FLD signals from the State Machine Processor.

Figure 6:
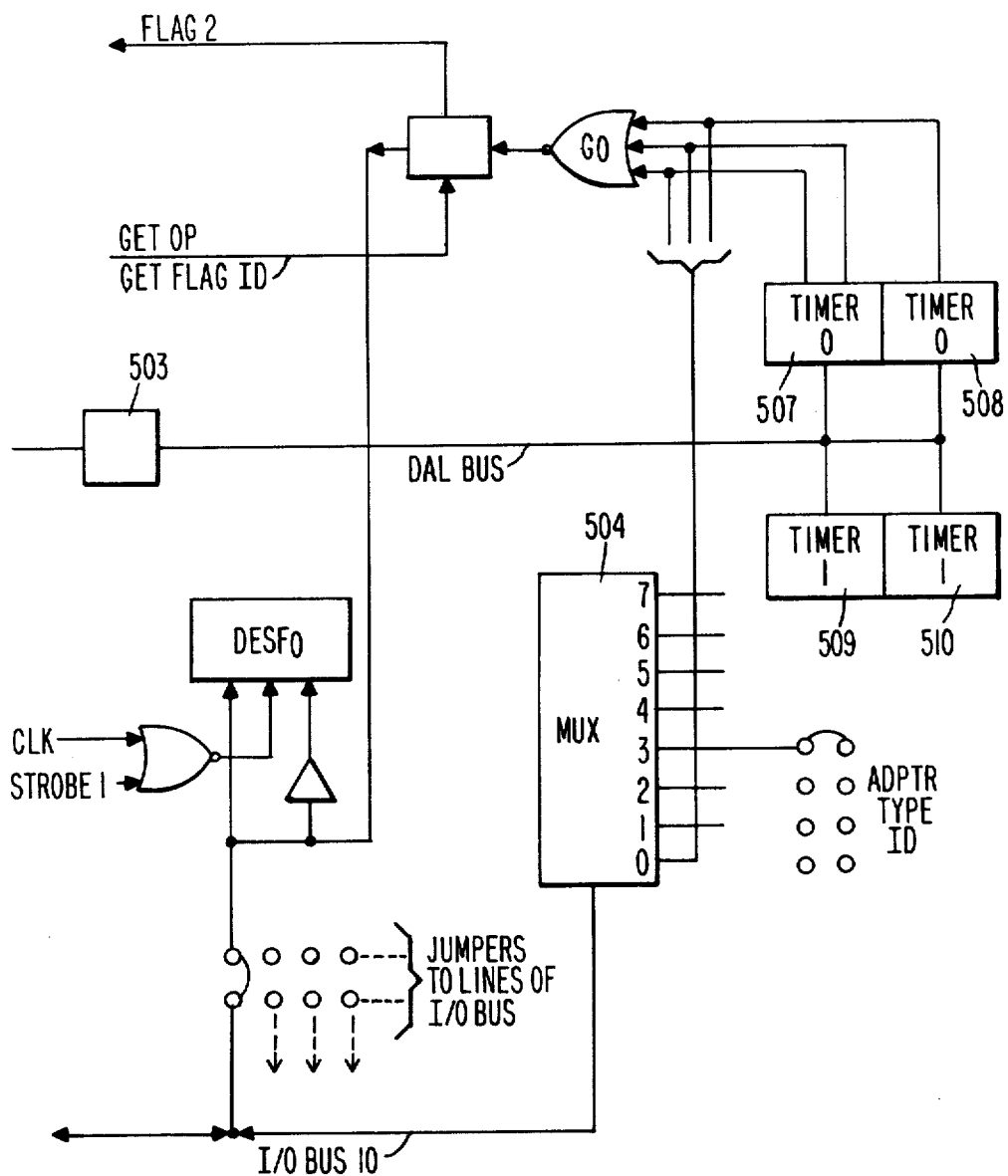
FIG. 6 is a schematic drawing of the circuitry for identifying a line adapter or its sub-components.

Flag operation, with reference to FIG. 6, is accomplished by the FLAG 2/ line which when low active notifies the State Machine Processor that a Line Adapter is requesting service. For example in FIG. 6, if Line Adapter 0 requests service then NOR Gate $G_0$ is activated to provide a signal (low) on the FLAG 2/ line.

Upon receiving this signal the State Machine Processor will initiate a GET OP on the GET FLAG ID line. This will send the output signal of Gate $G_0$ to a particular line of I/O bus (which is dedicated to a particular one of the Line Adapters) which, when read by the State Machine will identify the particular Line Adapter involved, in this case, the Line Adapter 0.

Similarly each Line Adapter as 1, 2, 3, etc. will have a Gate $G_1$, $G_2$ or $G_3$ to activate the FLAG 2/ line and cause the State Machine to "read" the particular "jumper" connection to the line on the I/O bus associated with that Line Adapter.

Data Bus Structures: With the exception of the RAM (FIG. 5), memory $550_{m1}$, $m_2$, all data sent to addressable components on the Line Adapter originate from the "Second Output Control Register 38 (FIG. 3) in the State Machine Processor. With the exception of RAM, all data "read" by the State Machine Processor from addressable components on the Line Adapter will go to the State Machine Processor via the I/O bus 10.

With reference to FIG. 4 (DLI/LA data bus structure), the Single Line Adapter data bus structure is shown.

As seen in FIG. 4, the Second Output Control Register 38 (FIG. 3) lines $17_2$ (OCREG $20n$) connect directly to the inputs of the Auto Call Unit Output Register 505 (ACUOR); and they also connect directly to the Transceiver Bus Controller chip 503 which provides bidirectional bus drivers.

The Auto Call Unit Output Register 505 is a six bit "D" type flip-flop register (DR6n). When the clock input is enabled, data from the Second Output Register 38 will be strobed into ACUOR 505.

Data sent to both the Timer 507 and to the USART 508, FIG. 4, originate from the Second Output Register 38 in the State Machine Processor (FIG. 3) and is sent through the Transceiver bus controller 503; then is sent to the addressed component. The data lines for the Timer component are HI active and for the USART component they are LO active. Being as both components share the same data bus, data to one of the components must be inverted. The Timer 507 is used to receive the "inverted" data, that is, $1 = 0$ and $0 = 1$, while the USART 508 receives the conventional format. Thus, a "one" bit from the Second Output Register 38 in the State Machine Processor (FIG. 3) will appear as a "one" bit to the USART (active low) and as a "zero" bit to the Timer. The Transceiver bus controller 503, although being a three-state device, is not used in its third or high impedance state. It is used for driving either DIN (data in) to DOUT (data out) or DOUT to ROUT depending on the state of the RE signal which originates from bit 4 of the First Output Control Register 37 in the State Machine Processor. When bit 4 of Register 37 is ON, the signal RE is positive and "enables" the DIN to DOUT direction through the Transceiver bus controller 503.

Reading of information (except RAM read) from a Line Adapter is performed by decoded GET OPs, and the read information is available on the least significant 8 bits of the I/O bus 10. The 8-1 multiplexor 504 is the source of the read information.

On the "Single" Line Adapter (FIG. 4) four of the eight inputs to MUX 504 are used by the Line Adapter and the remainder are used by the Data Link Interface (DLI). The multiplexors (MUX's) are chip selected (low level) during a GET OP when the V-FLD (3:2) is equal to "11" and either V-FLD (4:1) equals 0 (DLI GET) or the Designate Flip-Flop (DESF) is ON (LA GET).

On the "Quad" Line Adapter cards (FIG. 2) there are 16 multiplexors, each having an eight-one ratio. There are 8 multiplexors for each pair of Line Adapters.

As seen in FIG. 4, the eight input lines to MUX 504 are divided in half such that four lines connect to the DLI (Data Link Interface), and four lines connect to the Line Adapter. Similarly in FIG. 2, in the Quad Line Adapter, the eight input lines of each group of eight multiplexors is divided in half, similar to the Single Line Adapter, thereby making four groups. Any group of four input lines is selected by its "Designate Flip Flop" (DESF, FIG. 5) being ON. The selection of any one of four lines of any such group is performed by the two least significant bits of the V-FLD of a GET OP.

Data to be "written into" RAM memory in a Line Adapter (FIGS. 2, 5 ) is sent via the I/O bus in 16 bits plus parity format. The data "read from" RAM memory in a Line Adapter is placed on the MEMOUT bus 12 with 16 bits plus parity.

Component Addressing: As seen in FIG. 4, the outputs of components to be "read" are routed to the inputs of the 8-1 multiplexor 504 which then drive the I/O bus 10. There are five components on a Line Adapter which may be "read" by the State Machine Processor, these are:

Component Requestor ID (CRID)
USART (508)
Timer (507)
Automatic Calling Unit Status (ACUST)
Adapter Type ID (ADPT.ID)

Although these five components on a Line Adapter may be read, the USART 508 and the Timer 507 share the same input line (ROUT) to the multiplexors. Selection of one of the four inputs in either group (of inputs to the 8-1 multiplexors) is performed by the two least significant bits of the V-FLD of the GET OP. V-FLD (3:4) equals 11XX and selection of one of the four inputs is determined as shown in Table Y-1.

TABLE Y-1

| V1(x) | V0(x) | Component Addressed |
|---|---|---|
| 0 | 0 | Component Requestor ID |
| 0 | 1 | USART/Timer |
| 1 | 0 | ACU Status |
| 1 | 1 | Adapter Type ID (Identification) |

In FIG. 4 the Single Line Adapter multiplexor 504 allows three components on a Line Adapter to be written into (not including RAM). These are: Automatic Calling Unit Output Register 505 (ACUOR), the USART 508 and the Timer 507. The addressing of these three components occurs in two distinct fashions: decode of the V-FLD of PUT Ops and the decode of bits from the First Output Control Register 37 in the State Machine Processor (FIG. 3).

The ACUOR 505 is addressed when a one-of-eight decoder chip decodes the PUT OP V-FLD (4:5) equal 01111 and the Strobe No. 2 is sent from the State Machine Processor. This decoding is performed only on the Single Line Adapter card and is sent to other Line Adapter cards via the frontplane connector. This decoded signal is received by a three input NOR gate (not shown) in each Line Adapter (whose other inputs are Clock and Designate FF). The output of this gate drives the clock input of the six bit ACU output register.

Data from the Second Output Control Register 38 (FIG. 3) will then be strobed into the ACUOR 505.

Chip Selecting: Addressing a USART or Timer on a designated Line Adapter is the same as "chip selecting" the component. This is accomplished with bits 0 and 1 of the First Output Control Register 37 in the State Machine Processor along with the Designate Flip-Flop in a Line Adapter.

Each Line Adapter will "AND" its Designate FF with bits 0 and 1 in order to provide a UCS (USART Chip Select) or a TCS (Timer Chip Select) for its USART or Timer.

The use of bits 0 and 1 in the First Output Control Register 37 is as follows:

TABLE Y-2

| Register Bit and Value | Signal Designation |
|---|---|
| Bit 0 = 1 | USARTCS = USART Chip Select-UCS |
| Bit 1 = 1 | TMRCS = Timer Chip Select-TCS |

The remaining bits of Register 37 are used for control signals, primarily for the USART and Timer.

Random Access Memory ($550_m$, FIG. 5): Each data comm line has 2,048 words of RAM available for its use. A word is equal to 16 data bits plus one parity bit. In FIG. 5 the RAM chip $550_m$ is a $4,096 \times 1$ bit static RAM with a Read Access time of 180 nanoseconds and is arranged with 17 chips making 4,096 words. On the DLI/LA card, 2,048 words are for the "Single" Line Adapter and 2,048 words are for the Data Link Interface. The "Quad" Line Adapter card (FIG. 2) provides 34 memory chips or 8,192 words of which 2,048 words are available for each line.

The data comm Line Adapter memory (for any line) is "pointed at" by the memory address lines, MADDR (15:5) equal 01110. This can be seen in FIG. 5 which shows the Data Link Interface/Line Adapter RAM $550_m$. A five bit Comparator $100_c$ on the DLI/LA card compares (for an "equal" condition) for (i) DLI memory selection; or for a "greater than" condition (MADDRnn 01110) which provides for (ii) Line Adapter RAM selection in a particular line adapter. The signal "LARAMSEL" (Line Adapter RAM Select) will go to all Line Adapter cards via the frontplane cable to select the "designated" Line Adapter RAM memory. If memory address lines MADDR (15:5) equal $0111 \times$ (DLI or LA Select) then a slow memory flip-flop (SLMF) $100_{sf}$ will be set equal to 1. The Flip-Flop $100_{sf}$ output (FIG. 5) drives an open collector NAND gate B2C whose output connects to the WAIT/ frontplane signal line to the State Machine Processor 600. This signal (WAIT/), when low, will force the State Machine Processor to "wait" until the signal goes "high". Using a RAM chip whose Read Access time is 180 nanoseconds requires the State Machine Processor to wait for one clock time, thereby when the DLI memory ($550_m$, FIG. 5) or any Line Adapter memory is selected, the SLMF (slow memory flip flop) will be "on" for one clock and then toggle off.

Selection of the RAM memory $550_m$ on the DLI/LA card is done via MADDR (15:5) equal to 01110 or else if MADDR (15:5) equal 01111 and the Designate Flip-Flop being ON then a particular RAM is selected. This logic controls the chip-select input on the RAM chips. The selection of RAM for DLI or for Line Adapter memory is handled by controlling the "A-11" (FIG. 5) address pin, as for example, on the RAM $550_m$ chip. FIG. 5 illustrates the typical setup for each Line Adapter RAM in the system having its own individual "A11" input from its own individual designate flip-flop, DESF. If MADDR (15:5) is equal to 01111 and the Line Adapter Designate Flip-Flop (DESF) is ON, the RAM is chip selected and the A-11 address input is TRUE.

The "Quad" Line Adapter card (FIG. 2) contains two groups of memory chips ($550_{m1}$, $550_{m2}$) wherein Data-Comm (D.C.) lines 0 and 1 on the card share the same group of RAM chips and Data-Comm lines 2 and 3 share the other group of RAM chips. The signal LARAMSEL (Line Adapter RAM Select, FIG. 5) goes to all Line Adapters and is then essentially ANDED with appropriate Designate conditions to allow the desired RAM group to be chip selected. A "division" of RAM for the first or second data-comm line on a Quad Line Adapter is handled by controlling the "A-11" address pin (FIG. 5) on the RAM chip (signal DESn where n=1) and for the third and fourth line, the "A-11" pin on the second group of RAM chips is controlled by DESn (FIG. 5) where n=3.

A "Dual" Line Adapter will only contain one group of memory chips (17) and will operate the same as line 0 and line 1 on the Quad Line Adapter. Data to be written into RAM must be placed on the I/O bus 10 by the State Machine Processor and "read data" will be sent to the State Machine Processor on the MEMOUTnn bus 12 (nn equals 00→16).

Clear: There are two methods of clearing used to clear the Line Adapters; these are "Power Up" Clear and "Designate" Clear.

The Power Up Clear is a signal which occurs during the power-up sequence for the cabinet housing the Line Adapters. The signal comes from the backplane of the Base Module cabinet and is active Low.

The Designate Clear is a function controlled by the State Machine Processor, and only the Line Adapters which are designated are the ones that get cleared. The Clear signal originates from bit 7 of the First Output Control Register 37 of the State Machine Processor (FIG. 3). The "Power-up" Clear operates to clear three components on the Line Adapter. These are: the Designate Flip-Flop; the Auto Call Output Register; and the USART.

The "Designate" Clear signal clears two components on the Line Adapter. These are: Auto Call Unit Output Register (ACUOR); and the USART.

USART Organization and Operation: The USART is a MOS/LSI device housed in a 40-pin Dual-in-line package and is TTL compatible on all inputs and outputs. The USART performs the functions of interfacing a "serial" data communications channel to a parallel digital system and is capable of full duplex communications with synchronous or asynchronous systems.

One preferred embodiment of the USART is that manufactured by Western Digital Corporation, 3128 Redhill Ave., Newport Beach, Calif. 92663 and is designated as Model UC1671 Asynchronous/Synchronous Receiver/Transmitter and described in their Technical Data Publication of August 1978 which includes a block diagram showing the various registers, controls and components which are briefly described herein below.

(i) Receiver Register (RR): this is an eight bit shift register which inputs the received data at a clock rate determined by an internal control register. The incoming data is assembled to the selected character in length and then transferred to the Receiver Holding Register with logic zeroes filling out any unused high-order bit positions. At this time the INTR (Interrupt) output is made active for informing the State Machine (600, FIG. 3) that the Receiver Holding Register contains valid data.

(ii) Receiver Holding Register (RHR): this is an 8-bit parallel buffer register which presents assembled receiver characters to the DAL (Data Access Line) bus lines (FIG. 2) when requested through a Read operation.

(iii) Comparator: the 8-bit comparator is used in the Synchronous Mode to compare the assembled contents of the Receiver Register and the SYN register or the DLE register. A "match" between the registers sets up the stripping of the received character (when programmed) by preventing the data from being loaded into the Receiver Holding Register. A bit in an internal Status Register is set when stripping is performed. The comparator output also enables character synchronization of the Receiver on two successive matches with the SYN register.

(iv) SYN Register: this is an 8-bit register which is loaded from the DAL (Data Access Line) lines (FIG. 2) by a Write operation and it holds the synchronization code used to establish receiver character synchronization. It serves as a fill character when no new data is available in the Transmitter Holding Register during transmission. This register cannot be read onto the DAL lines. It must be loaded with logic zeroes in all unused high-order bits.

(v) DLE Register: this is an eight bit register which is loaded from the DAL lines by a Write operation and holds the "DLE" (Delimiter) character used in the Transparent Mode of operation, in which an idle transmit period is filled with the combination DLE/SYN pair of characters rather than a single SYN character. In addition, the USART may be programmed to force a single DLE character prior to any data character transmission while in the "transmitter transparent mode".

(vi) Transmitter Holding Register (THR): this is an eight-bit parallel buffer register which holds parallel transmitted data transferred from the DAL lines by a Write operation. This data is transferred to the Transmitter Register (TR) when the transmitter section is enabled and the Transmitter Register is ready to send new data. During this transfer, the signal interrupt (INTR) is made active for informing the Line Support Processor that the Transmitter Holding Register is empty.

(vii) Transmitter Register: this is an eight-bit shift register which is loaded from the THR (Transmitter Holding Register), the SYN register, or the DLE register. The purpose of this register is to serialize data and present it to the transmitted Data Output lines.

(viii) Control Register: there are two eight-bit control registers (CR1, CR2) in the USART which hold device programming signals such as: mode selection, clock selection, interface signal control, and data format. Each of the control registers can be loaded from the data access lines (DAL) by a Write operation, or else read into the DAL lines by a Read operation. By designation, "CR 16" would represent bit 6 of control register 1; and "CR 23" would represent bit 3 of control register 2.

Operation of USART of Byte Oriented Line Adapter

ASYNCHRONOUS MODE: The framing of asynchronous characters is provided by a Start Bit (logic low) at the beginning of a character, and by one or more Stop Bits (logic high) at the "end" of a character. Reception of a character is initiated on recognition of the first Start Bit by a positive transition of the receiver clock, right after a proceeding Stop Bit. The Start and Stop bits are "stripped off" while assembling the serial bit input into a parallel character.

The character assembly is completed by the reception of the Stop Bit after the reception of the last character bit. If this bit is a logic "high", the character is determined to have "correct" framing and the USART is prepared to receive the next character. If the Stop Bit is logic "low", the Framing Error Status flag is set and the Receiver assumes this bit to be the Start Bit of the next character. Character assembly continues from this point if the input is still a logic "low" when sampled at the theoretical center of the assumed Start Bit. As long as the Receiver input is "spacing" (i.e. receiving a "Space" rather than a Mark), then all zero characters are assembled, and error flags and data received interrupts are generated so that line breaks can be determined. After a character of all zeroes is assembled along with a zero in the Stop Bit location, the first-received logic "high" is determined as a Stop Bit and this resets the receiver circuit to a "Ready" state for assembly of the next character.

In the Asynchronous Mode the character transmission occurs when information contained in the THR (Transmitter Holding Register) is transferred to the TR (Transmitter Register). Transmission is initiated by the insertion of a Start Bit, followed by the serial output of the character (least significant bit first) with parity, if enabled, following the most significant bit; then there is the insertion of the 1-, 1.5-, or 2-bit length Stop condition. If the THR (Transmitter Holding Register) is full, the next character transmission starts after the transmission of the Stop Bit of the present character in the TR (transmitter register). Otherwise, the "Mark" (logic high) condition is continually transmitted until the THR (Transmitter Holding Register) is loaded.

SYNCHRONOUS MODE: The synchronization of messages is carried out by a special Synchronization Character Code (SYN) transmitted at the beginning of a block of characters. The Receiver, when enabled, searches for two contiguous characters matching the bit pattern contained in the SYN register. During the time that the Receiver is searching, data is not transferred to the THR (Transmitter Holding Register) and status bits are not updated; and the Receiver interrupt is not activated. After the detection of the first SYN character, the Receiver assembles subsequent bits into characters whose length is determined by the contents of the USART internal control register. If, after the first SYN character detection, a second SYN character is present, the Receiver enters the Synchronization Mode until the Receiver Enable Bit is turned "off". If a second successive SYN character is not found, then the Receiver reverts back to the Search Mode.

In the Synchronous Mode, a continuous stream of characters are transmitted once the Transmitter is enabled. If the THR (Transmitter Holding Register) is not loaded at the time the Transmitter Register has completed the transmission of a character, this "idle" time will be filled by a transmission of a character contained in the SYN register in the Non-Transparent Mode, or filled by the characters contained in the DLE and the SYN registers respectively (while in the Transparent Mode of operation).

RECEIVER OPERATION: The Receiver data input is clocked into the Receiver Register by a 1× Receiver clock from a modem Data Set, or by a local 32× bit rate clock (asynchronous) selected from one of four input pins. When using the 1× Receiver Clock, the Receiver data is sampled on the positive transition of the clock in the Synchronous Modes. When using a 32× clock in the Asynchronous Mode, the Receive Sampling Clock is phased to the "Mark-To-Space" transition of the Received Data Start Bit and defines (through clock counts) the center of each received Data Bit at the positive transition 16 clock periods later. When the complete character has been shifted into the Receiver Register, it is transferred to the RHR (Receiver Holding Register); the unused, higher number bits are filled with zeros. At this time the "Receiver Status bits" (Framing Error/Sync Detect, Parity Error/DLE Detect, Overrun Error, and Data Received) are updated in the Status Register and the Data Received "interrupt" is activated. Parity Error is set if encountered while the Receiver Parity Check is "enabled" in the internal control register. Overrun Error is set if the Data Received Status Bit is not cleared through a Read Operation by an external device when a new character is ready to be transferred to the RHR (Received Holding Register). This error flag indicates that a character has been lost, that is, new data is lost, and the old data and its status flags are saved.

The characters assembled in the Receiver Register that match the contents of the SYN or the DLE register are not loaded into the RHR (Receiver Holding Register), and the DR (Data Received) interrupt is not generated if bit 3 of USART control register 2 (CR23=SYN Strip) or Bit 4 of USART control register 1 (CR14=DLE Strip) are set respectively. The SYN-DET and the DLE-DET status bits are set with the next non-SYN or DLE character. When both control register bits CR23 and CR14 are set (Transparent Mode), the DLE-SYN combination is stripped. The SYN comparison occurs only with the character received after the DLE character. If two successive DLE characters are received, only the first DLE character is stripped. No parity check is made in this mode.

TRANSMITTER OPERATIONS: Information is transferred to the THR (Transmitter Holding Register) by a Write operation. Information can be loaded into this THR at any time, even when the Transmitter is not enabled. Transmission of data is initiated only when the Request-to-Send Bit is set to a logic "one" in the USART control register and the Clear-to-Send input is at a logic "low". Information is normally transferred from a THR to the Transmitter Register when the latter has completed transmission of a character. However, information in the DLE register may be transferred prior to the information contained in the THR if the Force-DLE signal condition is enabled (CR15=Force, DLE and CR16=TX Transparent and set to a logic "one"). The control bit CR15 must be "set" prior to loading of a new character in the THR to insure forcing the DLE character prior to transmission of the data character. The Transmitter Register output passes through a Flip Flop which delays the output by one clock period. When using the 1× clock generated by the modem Data Set, the output data changes state on the negative clock transition and the delay is one bit period.

When the Transmitter is enabled, a Transmitter "interrupt" is generated each time the THR is empty. If the THR is empty when the Transmitter Register is ready for a new character, the Transmitter enters an "idle" state. During this idle time, a logic "high" will be presented to the Transmitted Data Output in the Asynchronous Mode or the contents of the SYN register will be presented in the Synchronous Non-Transparent Mode (CR16=0). In the Synchronous Transmit Transparent Mode (enabled by bit-6 of USART control register 1=Logic 1), the idle state will be filled by a DLE-SYN character transmission in that order. When entering the Transparent Mode, the DLE-SYN fill-in will not occur until the first forced DLE.

If the Transmitter section is disabled by a reset of the Request-to-Send signal (RTS), any partially transmitted character is completed before the Transmitter section of the USART is disabled. As soon as the CTS signal (Clear-to-Send) goes high, the transmitted data output will go high.

When the Transmit Parity is enabled, the selected Odd or Even parity bit is inserted into the last bit of the character in place of the last bit of the Transmitter Register. This limits transfer of character information to a maximum of 7-bits plus parity or 8-bits without parity. Parity cannot be enabled in the Synchronous Transparency Mode.

INPUT/OUTPUT OPERATION OF USART: All Data, Control and Status words are transferred over the Data Access Lines (DALO-7) as seen in FIG. 2, DAL. Additional input lines provide controls for addressing a particular unit and regulating all input and output operations. Other lines provide interrupt capability to indicate to a controller that an input operation is requested by the USART. All input/output terminology is referenced to the Bus Controller-Transceiver 503, FIG. 2, so that a "Read" or Input takes data from the USART and places it on the DAL lines to the Transceiver 503, while a "Write" or an Output places data from the Transceiver 503 onto the DAL lines and into the USART. The following input/output terminology discussed below is referenced to the Bus Controller-Transceiver 503.

(i) READ: A Read operation is initiated by the placement of an 8-bit address from State Machine 600 on the DAL by the Bus Controller 503, FIG. 2. When the Chip Select signal goes to a logic "low" state, the USART (as 508) compares, bits 7-3 of the DAL with its hard-wired ID code (on USART Pins 17, 22, 24, 25, 26) and becomes selected on a "Match" condition. Bits 2-0 of the address are used to select the USART registers to "read from" as follows:

TABLE Y-3

| Bits 2-0 | Selected Register of USART |
| --- | --- |
| 000 | Control Register 1 |
| 010 | Control Register 2 |
| 100 | Status Register |
| 110 | Receiver Holding Register |

When the Read Enable (RE) input line of the USART is set to a logic "low" condition by the State Machine 600, the USART gates the contents of the addressed register onto the DAL bus. The Read operation terminates, and the devices become unselected, and both the Chip Select and Read Enable return to the logic "high" condition. Reading of the Receiver Holding Register clears the DR (Data Received) status bit. Bit zero must be a logic "low" in Read or in Write operations.

(ii) WRITE: A Write operation is initiated by making a Chip Select input go to the logic "low" state. Bits 2-0 of the address are used to select USART registers which are written into as follows:

TABLE Y-4

| Bits 2-0 | Selected Register of USART |
| --- | --- |
| 000 | Control Register 1 |
| 010 | Control Register 2 |
| 100 | SYN and DLE Register |

TABLE Y-4-continued

| Bits 2-0 | Selected Register of USART |
| --- | --- |
| 110 | Transmitter Holding Register |

When the Write Enable (WE) line is set to a logic "low" condition by the State Machine, the USART gates the data from Transceiver 503 onto the DAL bus and into the addressed register. If data is written into the Transmitter Holding Register (THR), the THRE (THR empty) Status Bit is cleared to a logic zero. The "100" address loads both the SYN and DLE registers. After writing into the SYN register, the device is conditioned to write into the DLE register if followed by another Write pulse which has the "100" address. Any intervening Read or Write operation with another address resets this condition such that the next "100" will address the SYN register.

(iii) INTERRUPTS: The following conditions will generate interrupts:
1. Data Received (DR)—indicates transfer of a new character to the Receiver Holding Register (RHR) while the Receiver is enabled.
2. Transmitter Holding Register Empty (THRE)—indicates that the THR register is empty while the Transmitter is enabled. The first interrupt occurs when the Transmitter becomes enabled if there is an "empty" THR, or after the character is transferred to the Transmitter Register, thus making the THR empty.
3. Carrier On—this indicates the Carrier Detector input has gone "low" when DTR is "on". (DTR=Data Terminal Ready).
4. Carrier Off—indicates that the Carrier Detector input has gone "high" when DTR is "on".
5. DSR On—indicates the Data Set Ready input has gone "low" when DTR is "on".
6. DSR Off—indicates the Data Set Ready input has gone "high" when DTR is "on".
7. Ring On—indicates the Ring Indicator input has gone "low" when DTR is off.

Each time an Interrupt Condition exists, the INTR output from the USART is made a logic "low". The State Machine then acknowledges the Interrupt Request by setting the CS (Chip Select) and Interrupt Acknowledge Input (IACK) to the USART to a "low" state, otherwise the Interrupt Condition (INTR) would never get reset.

Auto Call Operation: (For Operations Using an 801 Auto Call Unit)

The 801 ACU has a 4-bit interface for receiving digits of the call number to be dialed. This interface is defined by the EIA Standard RS-366 and involves the following signals:

TABLE Y-5

| | |
| --- | --- |
| Call Request | CRQ |
| Data Line Occupied | DLO |
| Present Next Digit | PND |
| Digit Present | DPR |
| Data Set Status | DSS |
| Abandon Call and Retry | ACR |
| NB 8 Digit | |
| NB 4 Digit | |
| NB 2 Digit | |
| NB 1 Digit | |

The dialing sequence operates as follows:

The Line Adapter turns CRQ "on" provided that the DLO is "off". After detection of the dial tone, which is done by the 801, the digits are transferred one at a time to the 801. The 801 converts the digits to signals which duplicate the function of a rotating dial-pulse or a touch-tone frequency compatible signal. These signals are transmitted to the phone line. At call completion, DSS comes "on" to signify receipt of answer tone from the called Data Set. Receipt of DSS allows the line to be transferred to the ACU associated data set. If DSS fails to come "on", the Abandon Call and Retry (ACR) timer begins timing out.

With pulse dialing, a typical 10 digit number takes 15 seconds to dial; for touch-tone dialing the same number requires approximately one second. The answer sequence begins sometime after the last digit has been sent by the 801.

Interface Operation (Data-Comm Line-Adapter/State Machine)

The UIO Data-Communication Line-Adapter is an application dependent device which is controlled by the UIO State Machine Processor 600. The basic types of Line Adapters are available—these are the "Character Oriented" Line Adapter and the "Bit Oriented" Line Adapter, each of which may have a variety of electrical interfaces to the data communication lines.

One to eight Line Adapters may be serviced by one State Machine Processor on an individual basis. Each Line Adapter contains components which are addressable and are serviced by the State Machine Processor with PUT or GET instructions. The components on the Line Adapter are serviced with one or a series of instructions which, in some cases, provide sequential control of the component. The "communication" between the State Machine Processor and the Line Adapter can be separated into two basic groups:

(i) Undesignated
(ii) Designated

The "Undesignated" operations do not require the Line Adapter to be designated to execute those instructions. "Designated" type operations require the Line Adapter to be designated or "identified" to execute those instructions or series of instructions.

The following operations (except for ACUOR) in addition to requiring the Line Adapter to be "Designated" will use the First Control Register 37 in the State Machine Processor 600 for control purposes to components on a Line Adapter. With the exception of the Clear OP, all other operations will be a series of PUT/-GET OPs to provide the necessary sequential control.

"Data" outputted to the Line Adapter for these operations will originate from the Second Output Control Register 38 of the State Machine in FIG. 3.

The bits of the First Output Control Register 37 of the State Machine (FIG. 3) are organized for control functions as follows:

TABLE Y-6

| Bit | Signal | (Output Control Register Bits for First Control Register 37, FIG. 3) |
|---|---|---|
| 0 | UCS | USART Chip Select - This bit must be a "1" when the USART requires a chip select. |
| 1 | TCS | Timer Chip Select - This bit must be a "1" when the Program Timer/Baud Rate Generator requires a chip select. |
| 2 | IACKI | Interrupt Acknowledge In - This bit must be a "0" to acknowledge an interrupt from a designated and chip selected USART. |
| 3 | WE | Write Enable - This bit must be "0" to enable writing to the USART or Timer. |
| 4 | RE | Read Enable - This bit must be "0" to enable reading from the USART or Timer. |
| 5,6 | A0,A1 | Address Bit 0 or 1 - These two bits select a register within the Timer. |
| 7 | CLR | Clear - This bit must be "1" to provide a clear to the Line Adapter. |

USART Interfacing

Three procedures are used when communicating with a USART on a Line Adapter; these are:
(i) Interrupt Acknowledge Procedure
(ii) Read Procedure
(iii) Write Procedure Timer/Baud Rate Generator Interfacing Two basic procedures are used when communicating with the timer components; these are: (i) Write Procedure and (ii) Read Procedure.

Five control signals originating from unique bits of the First Output Control Register 37 are used for the Timer. These are:
TCS—Timer Chip Select
A0, A1—Register Addressing Lines
WE—Write Enable
RE—Read Enable Baud Rate Generator The "character" oriented UIO Data Comm Line Adapters will use a USART which requires an input clock that is 32 times faster than the bit-time of the Asynchronous line it is communicating with. To obtain this X32 clock it is preferred to use an Intel 8253 programmable timer chip, whose squarewave output is connected to the USART. This timer is driven by a crystal controlled clock whose frequency is 1.2288 megahertz. After initializing the Timer, a divisor value must be loaded which will produce the necessary X32 clock.

What is claimed is:

1. In a line support processor for controlling data transfer operations between a host computer and remote data terminals, wherein said line support processor includes a plurality of line adapters, a data link interface unit with local memory and a microprocessor, said microprocessor including program data in an internal ROM and external RAM storage means and having an I/O bus and output control registers providing control data and information data to said line adapters, a component selection system for a multiple line adapter organization comprising:

(a) a plurality of line adapters, each of which includes its own line adapter memory and a data-comm line to a remote terminal, each of said line adapters being operatively controlled by said microprocessor;

(b) logic means for decoding command signals from said microprocessor and conveying said signals to a specific line adapter in said line adapter organization.

2. The selection system of claim 1, wherein said logic means includes:
   (a) a designate flip-flop for each separate line adapter;
   (b) comparator means in said data link interface unit, said comparator means including:
      (b1) a first set of input signals on address lines from said microprocessor;
      (b2) a second set of preset input signals;
      (b3) first and second output lines for signal output reflective of equality or non-equality between said first and second input signals to respectively select either said local data link interface memory or said line adapter memory.

3. The selection system of claim 2, which includes:
   (a) jumper connection means from each line of said I/O bus to a different designate flip-flop for uniquely identifying each designate flip-flop.

4. The selection means of claim 3, wherein each pair of line adapters includes its own:
   (a) multiplexor means for selecting data for transfer to said I/O bus.

5. The selection means of claim 3, which includes:
   (a) means to selectively designate a particular line adapter in said multiple line adapter organization.

6. The selection means of claim 5, wherein said means to selectively designate a line adapter includes:
   (a) a PUT operator instruction from said microprocessor which places a pointer bit (=1) on a single particular jumper line of said I/O bus and strobes said designate flip-flop to set said designate flip-flop.

7. The selection system of claim 6, wherein each of said line adapters further includes:
   (a) input/output circuit means connected to a remote terminal and to said host computer, via said multiplexor, for effectuating command signals from said microprocessor for handling data transfers with a specified protocol.

8. The selection system of claim 7, wherein each of said input/output circuit means uses components which include:
   (a) a protocol controller means;
   (b) a first program timer;
   (c) a second program timer.

9. The selection system of claim 8, which includes:
   (a) means to read which component of a designated line adapter requires service from said microprocessor.

10. The selection system of claim 9, wherein said means to read which component requests service includes:
    (a) means, by each component, to set (=1) a unique line on said I/O bus particular only to itself;
    (b) a GET operator from said microprocessor to read which component on said line adapter is set via said I/O bus, thus to identify the component requesting service.

11. The selection system of claim 4, which includes:
    (a) means to address a particular RAM memory storage means in a designated adapter.

12. The component selection system of claim 6, wherein said microprocessor includes first and second output control registers connected to said I/O bus, and each line adapter includes a USART chip and timer chip.

13. The system of claim 12, wherein said second output control register includes:
    (a) first and second dedicated bit positions which provide an output to said multiplexor, and settable by said microprocessor, to select either said USART chip or said timer chip in a designated line adapter.

* * * * *